United States Patent
Burge

(10) Patent No.: US 10,422,638 B2
(45) Date of Patent: Sep. 24, 2019

(54) LEVEL WITH ROTATING ANGLE INDICATOR

(71) Applicant: Milwaukee Electric Tool Corporation, Brookfield, WI (US)

(72) Inventor: Joseph William Burge, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 132 days.

(21) Appl. No.: 15/494,118

(22) Filed: Apr. 21, 2017

(65) Prior Publication Data

US 2017/0328711 A1 Nov. 16, 2017

Related U.S. Application Data

(60) Provisional application No. 62/335,272, filed on May 12, 2016.

(51) Int. Cl.
| | | |
|---|---|---|
| *G01C 9/28* | (2006.01) | |
| *G01C 9/02* | (2006.01) | |
| *G01C 9/34* | (2006.01) | |
| *G01C 9/06* | (2006.01) | |

(52) U.S. Cl.
CPC ............ *G01C 9/28* (2013.01); *G01C 9/02* (2013.01); *G01C 9/34* (2013.01); *G01C 2009/066* (2013.01)

(58) Field of Classification Search
CPC ... G01C 9/28; G01C 9/02; G01C 9/34; G01C 2009/066
USPC ......... 33/347, 365, 371, 374, 379, 381, 385, 33/451, 452
See application file for complete search history.

(56) References Cited

U.S. PATENT DOCUMENTS

| | | | | |
|---|---|---|---|---|
| 297,719 | A * | 4/1884 | Root ................. | G01C 9/28 33/371 |
| 892,468 | A * | 7/1908 | Unger ................ | G01C 9/12 33/391 |
| 964,066 | A * | 7/1910 | Sprenkle .......... | G01C 9/12 33/351 |

(Continued)

FOREIGN PATENT DOCUMENTS

| | | |
|---|---|---|
| TW | 420295 | 11/2000 |
| TW | 412008 | 1/2001 |
| TW | 514250 | 12/2002 |

OTHER PUBLICATIONS

Klein Tools, Accu-Bend Level, Cat. No. 9317RE http://www.kleintools.com/catalog/electricians-levels/accu-bend-level> webpage accessed Jul. 21, 2014.

(Continued)

*Primary Examiner* — Justin Seo
*Assistant Examiner* — Tania C Courson
(74) *Attorney, Agent, or Firm* — Reinhart Boerner Van Deuren s.c.

(57) ABSTRACT

A tool, such as a level, including a rotating angle indicator is provided. The level may include a gripping structure for coupling the level to a workpiece. The level may include one or more bubble level vials. The level may include a window arrangement to provide viewing of an angle-indicating needle from a variety of angles, and one such window may be located at the end of the level and at least partially surrounds the angle-indicating needle.

21 Claims, 4 Drawing Sheets

(56) References Cited

U.S. PATENT DOCUMENTS

| | | | | |
|---|---|---|---|---|
| 1,377,720 | A * | 5/1921 | Neff | G01C 9/12 33/203.18 |
| 1,398,183 | A * | 11/1921 | Fagrie | G01C 9/34 33/451 |
| 2,079,070 | A * | 5/1937 | Johnston | G01C 9/26 33/337 |
| 2,601,643 | A * | 6/1952 | Sulger | G01C 9/12 33/371 |
| 2,624,954 | A * | 1/1953 | Watkins | G01C 9/12 33/348 |
| 2,636,273 | A * | 4/1953 | Morris | B25H 7/005 33/21.3 |
| 2,824,381 | A * | 2/1958 | Traupmann | G01C 9/34 248/231.41 |
| 3,188,747 | A * | 6/1965 | Race | G01B 5/255 33/203.12 |
| 3,423,839 | A * | 1/1969 | Liskey | G01B 5/255 33/203 |
| 3,707,772 | A * | 1/1973 | Cotter | G01C 9/16 33/373 |
| 4,188,729 | A * | 2/1980 | Peterson | G01C 9/12 33/332 |
| 4,394,799 | A * | 7/1983 | Moree | G01C 9/28 33/343 |
| 4,908,949 | A * | 3/1990 | Jaccard | A61C 1/08 33/334 |
| 5,103,569 | A * | 4/1992 | Leatherwood | G01C 9/32 33/343 |
| 5,154,000 | A | 10/1992 | Mahoney et al. | |
| 5,394,616 | A * | 3/1995 | Claxton | G01C 15/002 33/275 R |
| 5,531,031 | A * | 7/1996 | Green | G01C 15/008 33/281 |
| 6,240,649 | B1 * | 6/2001 | McElroy | G01C 15/002 33/286 |
| 6,351,890 | B1 * | 3/2002 | Williams | G01C 15/002 33/286 |
| 6,532,675 | B2 * | 3/2003 | Letourneau | G01C 9/12 33/277 |
| 6,839,973 | B1 * | 1/2005 | Woodward | G01C 9/28 33/343 |
| D529,826 | S | 10/2006 | Jordan et al. | |
| 7,137,209 | B2 * | 11/2006 | Northern | G01C 9/12 33/371 |
| 7,392,593 | B2 * | 7/2008 | Rivers | E06C 7/003 182/18 |
| 8,061,051 | B2 | 11/2011 | Allemand | |
| 8,769,839 | B1 * | 7/2014 | Paesano | B64C 27/008 33/301 |
| 9,885,571 | B2 * | 2/2018 | Hoppe | G01C 9/26 |
| 10,260,874 | B2 * | 4/2019 | De Cino | G01C 9/34 |
| 2016/0025490 | A1 | 1/2016 | Hoppe et al. | |

OTHER PUBLICATIONS

Greenlee, Level, Bubble, Cat. No. L77 http://www.greenlee.com/products/LEVEL%2540c-BUBBLE-(POP).html webpage accessed Jul. 21, 2014.

* cited by examiner

LEVEL WITH ROTATING ANGLE INDICATOR

CROSS-REFERENCE TO RELATED PATENT APPLICATION

The present application claims the benefit of and priority to U.S. Provisional Application No. 62/335,272, filed on May 12, 2016, which is incorporated herein by reference in its entirety.

BACKGROUND OF THE INVENTION

The present invention relates generally to the field of tools. The present invention relates specifically to a tool, such as a level, a spirit level, a vial level, a bend level, a conduit-bend level, a no-dog level, etc., with rotating angle indicator. Levels are used to determine the levelness of a structure, surface or workpiece. In use, the level is placed on or in contact with a surface or workpiece to be measured, and the user views the location of a bubble within a vial relative to markings that indicate the levelness of the structure, surface or workpiece.

SUMMARY OF THE INVENTION

One embodiment of the disclosure relates to a leveling tool including a level body and an angle indicating needle rotatably mounted to an axle supported by the level body. The leveling tool includes an attachment device supported by the level body and configured to engage a workpiece to support the leveling tool in a fixed relation to the workpiece. The leveling tool includes a level vial supported by the level body at a position between the angle indicating needle and the attachment device.

Another embodiment of the disclosure relates to a leveling tool including a level body. The level body includes a pair of opposing base surfaces, a pair of opposing side surfaces each extending between the opposing base surfaces, a first end, a second end opposite the first end and a longitudinal axis extending between the first end and the second end. The leveling tool includes an angle indicating needle rotatably mounted to an axle supported by the level body, and the angle indicating needle is mounted to the axle at the second end of the level body. The leveling tool includes an attachment device supported by the level body and configured to engage a workpiece to support the leveling tool in a fixed relation to the workpiece, and the attachment device is located at the first end of the level body. The leveling tool includes an end window supported within the level body at the second end of the level body such that the angle indicating needle is viewable through the end window from outside of the level body from a viewing position located along the longitudinal axis.

Another embodiment of the disclosure relates to a leveling tool. The leveling tool includes a level body having a pair of opposing side surfaces, a first end, a second end and a longitudinal axis extending in the direction between the first end and the second end. The leveling tool includes a first opening defined within the level body, and the first opening extends between the opposing side surfaces in a direction perpendicular to the longitudinal axis. The leveling tool includes a second opening defined within the level body, and the second opening extends between the opposing side surfaces in a direction perpendicular to the longitudinal axis. The leveling tool includes an angle indictor rotatably mounted to an axle supported by the level body within the first opening; the angle indicator freely rotates around the axle relative to the level body as the level body moves such that a point of the angle indicator points in a direction opposite of gravity. The angle indicator is mounted to the axle within the first opening such that the point is viewable through the first opening from either of the opposing side surfaces. The leveling tool includes a level vial supported by the level body within the second opening such that the level vial is viewable through the second opening from either of the opposing side surfaces.

Another embodiment of the disclosure relates to a level including a level body having a first opening. The level includes an angle-indicating needle rotatably mounted about an axle supported by the level body within the first opening. The level also includes a coupling device supported by the level body, and the coupling device is configured to rigidly couple the level to a workpiece. In specific embodiments, the coupling device is located at a first end of the level body, and the angle-indicating needle is located at a second end of the level body. In specific embodiments, the first end is opposite the second end, and the level includes base surface (s) that extend between the first and second ends in the direction of a longitudinal axis of the level body. In specific embodiments, the level includes a level vial located between the coupling device and the needle along the direction of the longitudinal axis. In specific embodiments, the level includes both a vertical level vial and a horizontal level vial located between the coupling device and the needle along the direction of the longitudinal axis.

One embodiment of the disclosure relates to a level including a level body having a first opening and a second opening. The level includes an angle-indicating needle rotatably mounted about an axle supported by the level body within the first opening. The level includes a translucent section supported within the second opening. The translucent section forms a window positioned to provide a view of the angle-indicating needle from the exterior of the level. The translucent sheet is curved and positioned such that the translucent sheet curves about the axle and has a width dimension that is parallel to the axle. In specific embodiments, the translucent sheet curves around the outer perimeter surface of the needle, and the needle point points at an inner surface of the translucent sheet. In specific embodiments, the second opening is located within an end surface of the level body.

Another embodiment of the disclosure relates to a level including a level body having a first opening and a second opening. The level includes an angle-indicating needle rotatably mounted about an axle supported by the level body within the first opening. The level also includes at least one level vial supported by the level body within the second opening. In specific embodiments, the level includes an attachment device or a coupling device supported by the level body, and the coupling device is configured to rigidly couple the level to a workpiece. In specific embodiments, the at least one level vial includes a vertical level vial and/or a horizontal level vial.

Additional features and advantages will be set forth in the detailed description which follows, and in part will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

DETAILED DESCRIPTION

Figure 1:
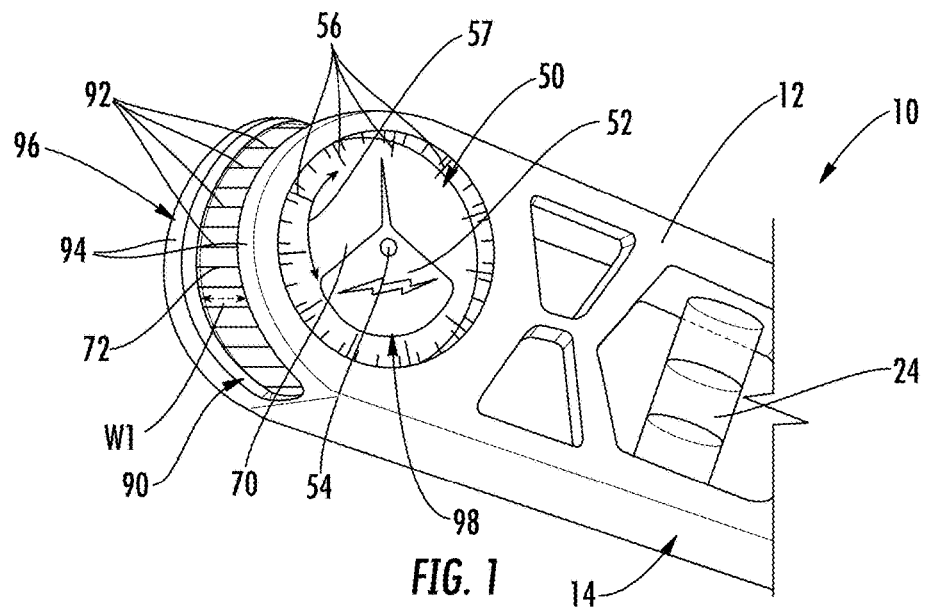
FIG. 1 is a partial perspective view from below of a level including a rotating angle indicator, according to an exemplary embodiment.

Referring generally to the figures, various embodiments of a leveling tool or level are shown. In general, the levels discussed herein include a rotating angle indicator. The rotating angle indicator includes a needle mounted to an axle rigidly fixed to the body of the level. The needle includes a weighted base. The weighted base, under the pull of gravity, causes the needle to rotate relative to the level body about the axle such that the needle remains pointed upward (i.e., opposite of the pull of gravity) even as the level body changes position. In use, the level body is rigidly coupled to a workpiece (e.g., a piece of pipe or conduit) such that the needle rotates within the level body as the workpiece is bent, thus providing an indication or measurement of the angle of the bend formed in the workpiece.

The rotating angle indicator discussed herein provides a full and continuous indication of angle during workpiece bending over a large range of bend angles, e.g., bend angles greater than 30 degrees, greater than 45 degrees, etc. and even includes angle indication during formation of multiple bends in the workpiece. In contrast, a typical level that includes only a bubble vial for levelness indication ceases to indicate further bending past a certain angle because once past a maximum angle, the bubble will have moved fully to one of the ends of the level vial. In particular, by providing continuous angle indication combined with the ability to indicate large bend angles, the level discussed herein allows the user to form multiple bends in a workpiece without the need to decouple the level from the workpiece to reset the level indicator as is typically needed when using a vial-type level for conduit bending.

Further, the continuous angle indication provided by the rotating angle indicator discussed herein allows the user to monitor the angle indication as the bend being formed approaches the desired bend angle. This continuous indication of bend angle during bending reduces the risk of overshooting the desired bend angle.

In addition, the level discussed herein includes a variety of additional features that further enhance the functionality of the rotating angle indicator discussed herein. For example, the level discussed herein includes both side windows and a partially surrounding end window that facilitates viewing of the angle indicating needle from a large number of viewing angles. In particular, the end window allows the angle-indicating needle to be viewed through the end window from outside of the level body from a viewing position located along the longitudinal axis. The level also includes at least one bubble vial, and specifically includes a vertical bubble vial and/or horizontal bubble vial which provides additional indications of levelness in one or more directions. The level also includes an attachment or coupling device, such as a friction-based gripper, located at one end of the level which allows the level to be rigidly and removably coupled to a workpiece, such as an end of a pipe or conduit.

Figure 2:
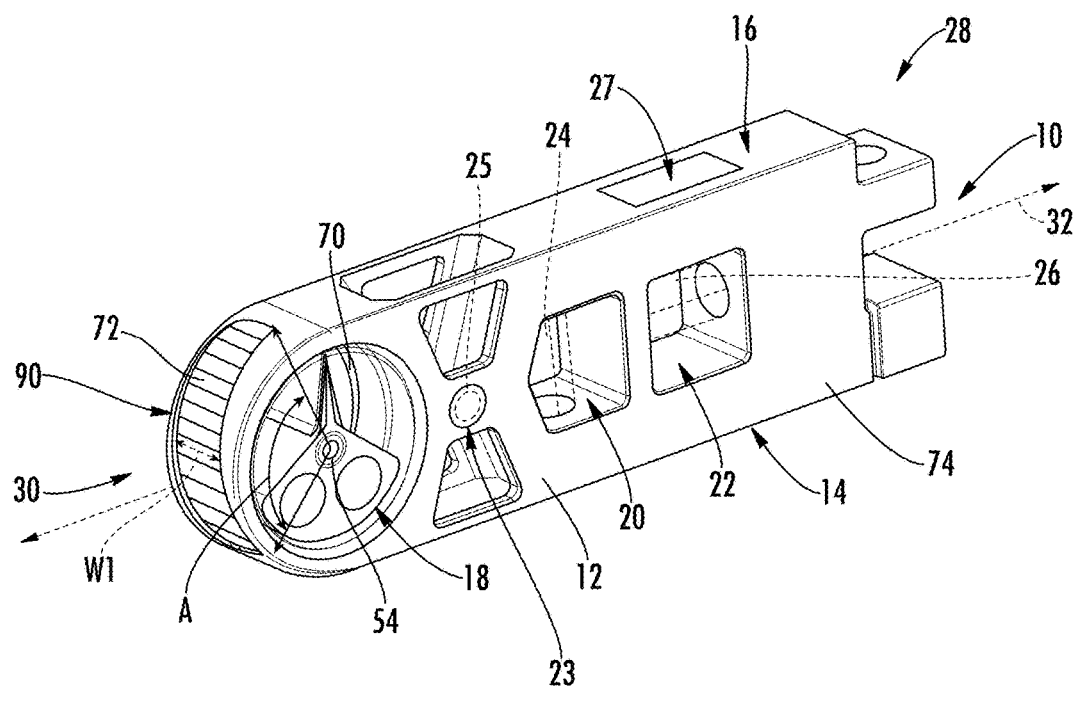
FIG. 2 is a perspective view from above of the level of FIG. 1, according to an exemplary embodiment.

Referring to FIG. 1 and FIG. 2, a leveling tool or device, shown as level 10, is shown according to an exemplary embodiment. In general, level 10 includes a body 12 that includes a pair of opposing base surfaces, shown planar base surface 14 and an opposing planar surface 16. A pair of opposing side surfaces 74 extend between opposing edges of base surfaces 14 and 16. In at least some embodiments, body 12 is formed from a metal material, such as extruded aluminum.

Level 10 includes a plurality of through openings of bores formed through body 12. As shown in FIG. 2, level 10 includes an opening 18, a first vial receiving opening 20 and a second vial receiving opening 22. As will be explained in more detail below, opening 18 fits and supports a rotating angle indicator and an associated window, first vial receiving opening 20 receives and supports a vertical level vial 24 (shown schematically with broken lines in FIG. 2), and second vial receiving opening 22 receives and supports a horizontal level vial 26 (shown schematically with broken lines in FIG. 2). In general, level vials 24 and 26 may be bubble level vials indicating levelness in a plane parallel to the axis of the vial. As shown in FIG. 2, level 10 includes a window 27 (e.g., a piece of translucent/transparent plastic or glass) mounted in planar surface 16 such that horizontal level vial 26 is viewable through window 27.

In addition, body 12 includes a third vial receiving opening 23 that receives a third level vial 25. In general, third level vial 25 is a horizontal bubble level vial that is perpendicular to axis 32 and is located between protractor 50 (explained below) and level vial 24. As will be explained in more detail below regarding FIGS. 6-8, third level vial 25 is used during bending to limit or prevent formation of twists (or "dogs") during bending. As can be seen in FIG. 2, each of the level vials 24, 25 and 26 is each aligned with its own axis that are all perpendicular to each other such that each level vial 24, 25 and 26 aligns with one of the orthogonal axes. As can be seen in FIG. 2, openings 18, 20, 22 and/or 23 are each defined within level body 12 such that the openings 18, 20, 22 and/or 23 extend all of the way through level body 12 between opposing side surfaces 74 in a direction perpendicular to side surfaces 74 and to longitudinal axis 32. In this arrangement, angle-indicating needle 52 and the level vials 24, 25 and 26 are viewable through the associated opening through either of the opposing side surfaces 74.

Figure 3:
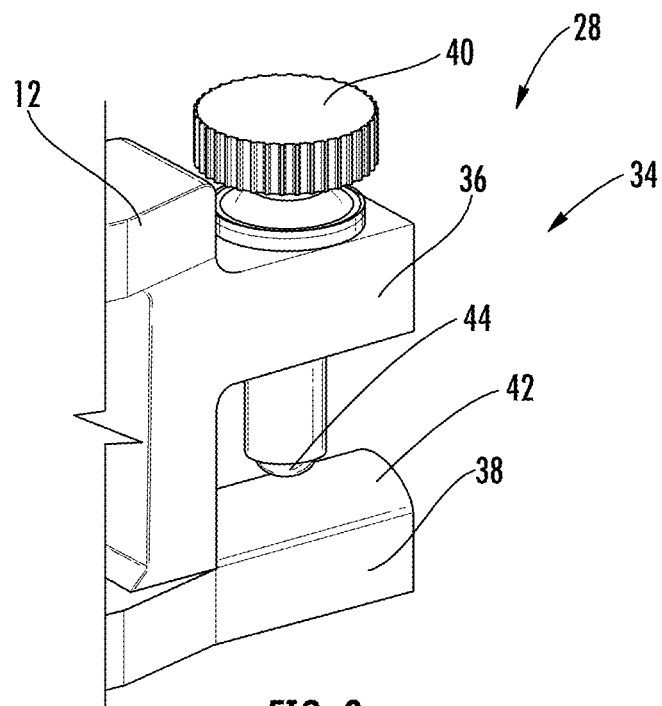
FIG. 3 is a perspective view of an end of the level of FIG. 1 including a gripping device, according to an exemplary embodiment.

Referring to FIG. 2, level 10 includes a first end 28 and a second end 30. As shown in FIG. 2, second end 30 is located at the opposite end of level body 12 from first end 28 in the direction of longitudinal axis 32, and base surfaces 14 and 16 generally extend in the direction of longitudinal axis 32 between first end 28 and second end 30. Referring to FIG. 2 and FIG. 3, located at first end 28, level 10 includes an attachment device or coupling device, shown as friction based gripper 34, which allows level 10 to be securely coupled to a workpiece. Gripper 34 is supported by level body 12 and is configured to engage a workpiece to support level 10 in a fixed relation relative to the workpiece.

As shown in FIG. 3, gripper 34 includes a first leg 36 and an opposing a second leg 38 that extend generally away from level body 12 in the direction of axis 32 at first end 28. Gripper 34 also includes a fixation member, shown as screw 40, extending through the first leg 36 toward second leg 38. In this embodiment, screw 40 is supported by first leg 36 and includes an outer surface that faces an outer surface of second leg 38 such that a friction coupling is formed between the outer surfaces of a workpiece, screw 40 and second leg 38, as screw 40 is tightened. In some embodiments, level 10 may include one or more groove (e.g., a v-groove) formed in level body 12 to facilitate locking of level 10 onto a workpiece.

In the embodiment shown in FIGS. 2 and 3, legs 36 and 38 are integral with and formed from the same piece of material (e.g., metal material, aluminum, etc.) as level body 12. Screw 40 is oriented perpendicular to the upward facing surface 42 of second leg 38. In general, a workpiece is placed between lower end 44 of screw 40 and upper surface 42 of second leg 38. In use, screw 40 is threaded downward through first leg 36 such that a friction coupling is formed between the outer surface of lower end 44 of screw 40, upper surface 42 second leg 38 and the outer surface of the workpiece. In other embodiments, level 10 may include a variety of other attachment or coupling devices, such as a clamp, clip, magnet, etc., located at first end 28.

Referring to FIG. 1, level 10 includes a rotating angle indicator, shown as protractor 50. In general, protractor 50 includes a needle 52 rotatably mounted within and supported by level body 12 via axle 54. Protractor 50 also includes a plurality of angle marks 56 surrounding needle 52. During use of level 10, needle 52 rotates about axle 54 in the direction of arrow 57 as the workpiece is bent, and this rotation causes relative movement between needle 52 and angle marks 56 providing an indication of the angular amount of the bend formed in the workpiece. Because of the weighted, wider base of needle 52 gravity causes needle 52 to remain pointed upward as level body moves during workpiece bending. In addition, protractor 50 can be used to measure the angle of a workpiece (e.g., a pipe or conduit) that has already been bent and installed.

Figure 4:
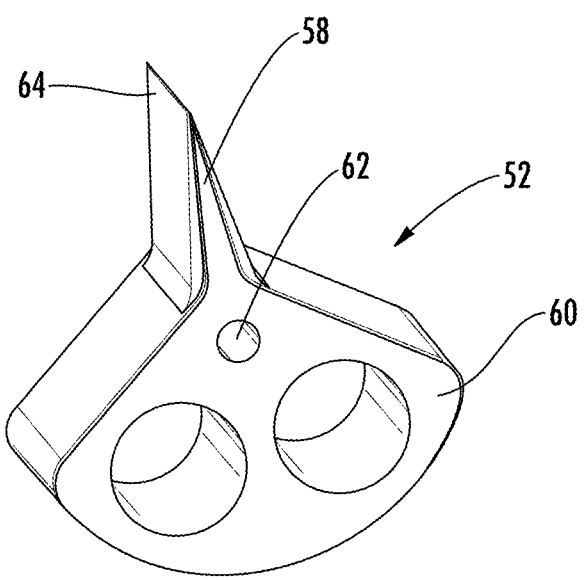
FIG. 4 is a perspective view of an angle-indicating needle of the level of FIG. 1, according to an exemplary embodiment.

Referring to FIG. 4, needle 52 is shown in more detail. Needle 52 includes a narrow needle arm 58, an expanded base 60 and an axle mounting aperture 62 located between needle arm 58 and base 60. Base 60 extends in a first direction away from aperture 62, and needle arm 58 extends in a second direction away from aperture 62 opposite from the first direction. In general, base 60 is heavier than needle arm 58 such that gravity holds base 60 downward which in turn ensures that needle arm 58 remains pointing upward. In the particular embodiment shown, base 60 is wider in the direction of axis 32 than needle arm 58 and the width tapers inward toward axle mounting aperture 62 (e.g., the width of base 60 increases as the distance from aperture 62 increases), and the increased size of base 60 accounts for the larger mass of base 60 relative to that of needle arm 58. Needle arm 58 tapers to a point 64 as the distance from aperture 62 increases. As discussed in more detail below, axle mounting aperture 62 receives an axle which allows needle 52 to rotate freely within level body 12 during angle measurement.

In use, level 10 is rigidly coupled to a workpiece via gripper 34. As the workpiece is bent by the user, needle 52 continues to point upward under the influence of gravity because needle 52 is permitted to rotate about axle 54 as level body 12 moves along with the workpiece as the workpiece is being bent. Thus, relative movement between angle marks 56 and tip 64 of needle arm 58 provides a visual indication of the bend angle formed in the workpiece.

Figure 5:
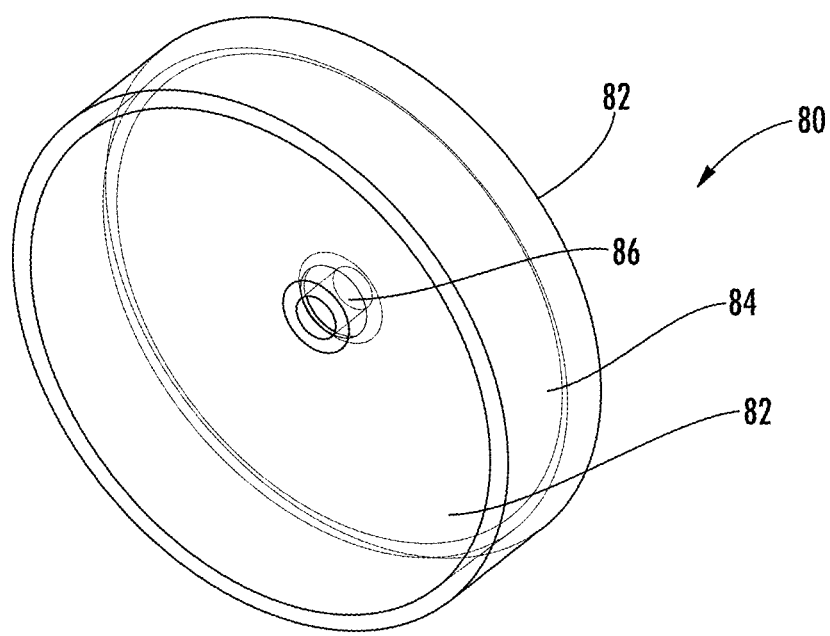
FIG. 5 is a perspective view of a window insert of the level of FIG. 1, according to an exemplary embodiment.

Referring to FIG. 1, FIG. 2 and FIG. 5, level 10 includes a window structure, including one or more window, that provides easy viewing of needle 52. In the specific embodiment shown, level 10 includes a pair of side windows 70 and an end window 72. Side windows 70 are located and supported within opening 18 of level body 12. Side windows 70 may be flat or domed pieces of transparent or translucent material (e.g., translucent glass, translucent tempered glass, translucent plastic, etc.) positioned along the lateral side surfaces 74 of level body 12. In specific embodiments, side windows 70 are substantially parallel (e.g., a portion of the outer surface of each side window 70 is parallel) to planes defined by side surfaces 74. Further, side windows 70 are substantially perpendicular (e.g., a portion of the outer surface of each side window 70 is perpendicular) to planes defined by surfaces 14 and 16. In addition, side windows 70 are positioned within level body 12 such that axle 54 and the axis about which needle 52 rotates is substantially perpendicular to side windows 70 (e.g., axle 54 and the axis about which needle 52 rotates is perpendicular to at least a portion of the inner or outer surface of windows 70).

In specific embodiments, angle marks 56 are formed on the outer surface of side windows 70 and are spaced circumferentially around axle 54. In particular embodiments, angle marks 56 are formed at the outer edges of windows 70 and extend radially inward from an outer perimeter or edge of windows 70. To ensure that needle 52 is fully visible through windows 70, the maximum outer dimension (e.g., an outer diameter in the case of a circular shaped window) of windows 70 is greater than the maximum height (e.g., the distance between the outermost point of base 60 and tip 64) of needle 52.

Referring to FIG. 5, window insert 80 is shown according to an exemplary embodiment. In the embodiment of level 10 shown, window insert 80 is a cylindrical body formed from two end walls 82 that act as windows 70 when insert 80 is mounted in level body 12. End walls 82 are joined by a cylindrical sidewall 84. The outer surface of sidewall 84 is coupled to or engages the inner surface of level body 12 within opening 18 in order to maintain window insert 80 within level body 12.

Insert 80 includes a central post 86. Post 86 is received through central opening 62 of needle 52 such that post 86 acts as axle 54 about which needle 52 rotates. In this arrangement, level 10 provides a window insert that provides both viewing of needle 52 and the structure about which needle 52 rotates.

Referring to FIG. 1 and FIG. 2, level 10 includes an end window 72. End window 72 is formed from a piece of translucent or transparent material (e.g., translucent glass, translucent tempered glass, translucent plastic, etc.) that is mounted within an opening 90 formed through an end surface of level body 12 located at second end 30. In the embodiment shown, end window 72 is a curved window that is curved to generally match the curvature of the portion of level body 12 at second end 30. In general, end window 72 provides an additional viewing area such that needle 52 may be viewed when the user is facing second end 30. In this arrangement, needle 52 is viewable through end window 72 from outside of level body 12 from a viewing position located along longitudinal axis 32. To facilitate angle indication through end window 72, end window 72 includes a plurality of spaced angle marks 92.

End window 72 is positioned to form a partial arc or curve around axle 54. In particular, end window 72 extends at least part of the distance between base surface 14 and upper surface 16. In this arrangement, end window 72 curves around axle 54 and includes a maximum width, W1, that extends in a direction perpendicular to planes defined side faces 74 of body 12, is parallel to planes defined by base surface 14 and upper surface 16 and is parallel to the rotational axis of axle 54. In specific embodiments, end window 72 curves around an outer perimeter surface 98 of needle 52 (e.g., the surface of needle 52 parallel to axle 54 in the orientation shown in FIG. 1), and in this arrangement, needle point 64 points at an inner surface of end window 72. In this position, longitudinal axis 32 intersects and is perpendicular to a portion (e.g., a line tangent to the curved outer surface of) end window 72.

In some embodiments, end window 72 extends the complete distance from base surface 14 to upper surface 16 such that a lower most portion of end window 72 is substantially coplanar with base surface 14 and an uppermost portion of end window 72 is substantially coplanar with upper surface 16.

In specific embodiments, the curvature of at least one of the inner surfaces and the outer surfaces of end window 72 is defined by an arc length, shown as angle A, in FIG. 2. In various embodiments, A is greater than or equal to 45 degrees and less than or equal to 180 degrees, and more specifically is between 60 degrees and 150 degrees.

Referring to FIG. 1, in various embodiments, the width, W1, of window 72 is less than the width of level body 12 at second end 30. This sizing allows end portions 94 of level body 12 to surround and act as a frame for window 72. In addition, window 72 is recessed below the outermost surface 96 of second end 30 of level body 12. This recess helps to protect window 72 from contact and/or breakage during use.

In various embodiments, various components of level 10 are positioned and oriented relative to each other to provide the improved level indicating or angle indicating functionality, and also to allow for appropriate and easy viewing of angle indication in a level for measuring workpiece bending, as discussed herein. In a specific embodiment, protractor 50 and gripper 34 are located at opposite ends of level body 12 which may increase visibility of needle 52 through windows 70 and 72. In this arrangement, level vials 24, 25 and 26 are located between protractor 50 and gripper 34 in the direction of longitudinal axis 32. In addition, protractor 50 is positioned within level body 12 such that axle 54 is perpendicular to axis 32, is perpendicular to side faces 74 of level body 12 and/or is parallel to the planes defined by surfaces 14 and 16. Further, needle 52 is positioned within level body 12 such that axle 54 is perpendicular to the longitudinal axis of screw 40 of gripper 34.

Figure 6:
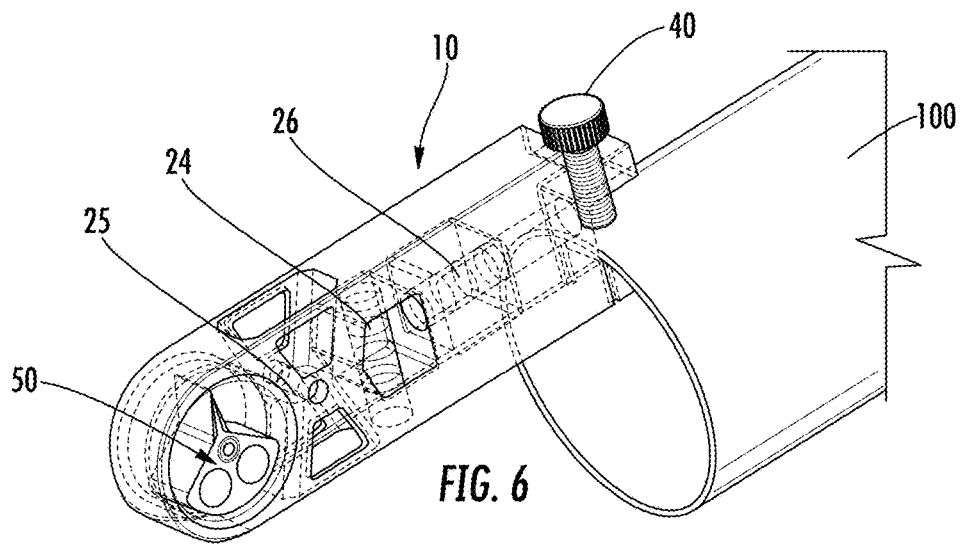
FIG. 6 is a perspective view of the level of FIG. 1 coupled to a workpiece, according to an exemplary embodiment.
Figure 7:
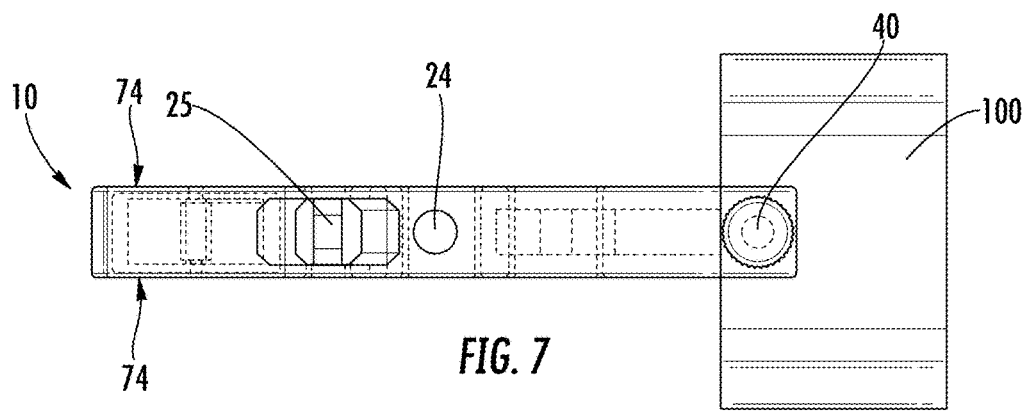
FIG. 7 is a top view of the level of FIG. 1 coupled to a workpiece, according to an exemplary embodiment.
Figure 8:
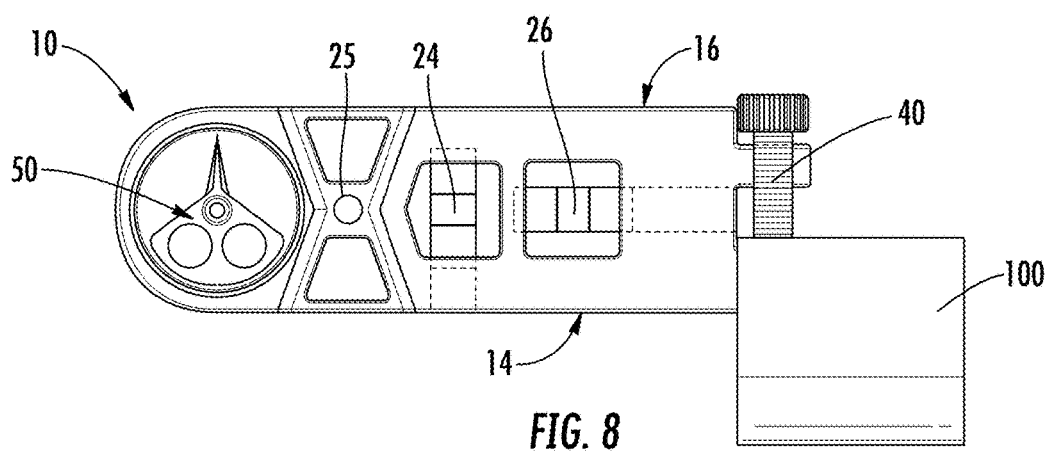
FIG. 8 is a side view of the level of FIG. 1 coupled to a workpiece, according to an exemplary embodiment.

Referring to FIGS. 6-8, coupling of level 10 to a workpiece, shown as pipe 100, and bending of pipe 100 is shown and described. To bend pipe 100, level 10 is coupled to one end of pipe 100 via screw 40 of gripper 34. Pipe 100 is then bent as desired using protractor 50 to indicate the bend angle and level vials 24, 25 and 26 to ensure the pipe 100 is bent as desired. As one example, in some bending processes, the user may utilize level vial 25 to limit or prevent twists from being formed in pipe 100 during bending. In one exemplary process, following attachment of level 10 to pipe 100, the user levels the bubble on level vial 25 before making the first bend. After making the first bend, the user can rotate the tubing exactly 180° by re-centering the bubble on level vial 25. By doing this, the user can be sure that all of the bends are made in the same plane, and thus, this allows the user to limit or prevent twists or "dogs" from being formed in pipe 100 during bending.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more than one component or element, and is not intended to be construed as meaning only one.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another, or with the two members and any additional member being attached to one another. Such joining may be permanent in nature or alternatively may be removable or releasable in nature. Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A leveling tool comprising:
   a level body including a base surface opposite an upper surface;
   an angle indicating needle rotatably mounted to an axle supported by the level body;
   an attachment device supported by the level body and configured to engage a workpiece to support the leveling tool in a fixed relation to the workpiece;
   a level vial supported by the level body at a position between the angle indicating needle and the attachment device; and
   an end window that partially surrounds the angle indicating needle and extends from the base surface to the upper surface.

2. The leveling tool of claim 1, wherein the level body comprises:
   a pair of opposing side surfaces each extending between the upper surface and opposing base surface;
   a first end;
   a second end opposite the first end; and
   a longitudinal axis extending between the first end and the second end;
   wherein the angle indicating needle is mounted to the axle at the second end of the level body;
   wherein the attachment device is located at the first end of the level body; and
   wherein the level vial is supported by the level body at a position between the first end and second end along the longitudinal axis.

3. The leveling tool of claim 2, further comprising:
   a first opening defined within the level body, the first opening extending between the opposing side surfaces in a direction perpendicular to the longitudinal axis, wherein the angle indicating needle is supported within the first opening such that the angle indicating needle is viewable through the first opening from either of the opposing side surfaces; and
   a second opening defined within the level body, the second opening extending between the opposing side surfaces in a direction perpendicular to the longitudinal axis, wherein the level vial is supported within the second opening such that the level vial is viewable through the second opening from either of the opposing side surfaces.

4. The leveling tool of claim 3, further comprising a pair of side windows supported within the first opening, each side window located adjacent to and substantially parallel to one of the opposing side surfaces of the level body.

5. The leveling tool of claim 4, further comprising angle indicating marks located on each of the pair side windows and spaced circumferentially around the axle.

6. The leveling tool of claim 5, wherein the end window is supported within an end surface located at the second end of the level body such that the angle indicating needle is viewable through the end window from outside of the level body from a viewing position located along the longitudinal axis.

7. The leveling tool of claim 6, wherein the end window is curved such that the end window partially surrounds the axle.

8. The leveling tool of claim 7, wherein the end window includes spaced angle indicator marks located along the end window.

9. The leveling tool of claim 1, wherein the angle indicating needle comprises:
   an axle mounting aperture;
   an expanded base extending in a first direction away from the axle mounting aperture, wherein a width of expanded base increases as the distance from the axle mounting aperture increases; and
   a needle arm extending away from the axle mounting aperture in a second direction opposite the first direction, wherein the needle arm tapers to a point as the distance from the axle mounting aperture increases.

10. The leveling tool of claim 1, wherein the level vial is aligned with a first axis, and further comprising a second level vial aligned with a second axis and a third level vial aligned with a third axis, wherein the first axis is perpendicular to second axis and the third axis and the second axis is perpendicular to the third axis.

11. A leveling tool comprising:
   a level body comprising:
      an upper surface opposing a base surface;
      a pair of opposing side surfaces each extending between the opposing base surface and upper surface;
      a first end;
      a second end opposite the first end; and
      a longitudinal axis extending between the first end and the second end
   an angle indicating needle rotatably mounted to an axle supported by the level body; wherein the angle indicating needle is mounted to the axle at the second end of the level body;
   an attachment device supported by the level body and configured to engage a workpiece to support the leveling tool in a fixed relation to the workpiece, wherein the attachment device is located at the first end of the level body; and
   an end window that partially surrounds the angle indicating needle and extends from the base surface to the upper surface and is supported within the level body at the second end of the level body such that the angle indicating needle is viewable through the end window from outside of the level body from a viewing position located along the longitudinal axis.

12. The leveling tool of claim 11, wherein the end window is curved and is positioned such that a width dimension of the end window is parallel to the axle.

13. The leveling tool of claim 12, wherein the end window includes spaced angle indicator marks located along the end window.

14. The leveling tool of claim 12, wherein the end window is a transparent sheet of material having a curved outer surface that defines an arc curving around the axle.

15. The leveling tool of claim 11, wherein the longitudinal axis intersects and is perpendicular to a surface of the end window.

16. The leveling tool of claim 11, further comprising a level vial supported by the level body at a position between the angle indicating needle and the attachment device along the longitudinal axis.

17. The leveling tool of claim 11, wherein a width dimension of the end window is less than a distance between opposing side surfaces of the level body and recessed below an outermost surface of second end.

18. A leveling tool comprising:
- a level body having a base surface opposing an upper surface, a pair of opposing side surfaces, a first end, a second end and a longitudinal axis extending in the direction between the first end and the second end;
- a first opening defined within the level body, the first opening extending between the opposing side surfaces in a direction perpendicular to the longitudinal axis;
- a second opening defined within the level body, the second opening extending between the opposing side surfaces in a direction perpendicular to the longitudinal axis;
- an angle indicator rotatably mounted to an axle supported by the level body within the first opening, the angle indicator freely rotates around the axle relative to the level body as the level body moves such that a point of the angle indicator points in a direction opposite of gravity, wherein the angle indicator is mounted to the axle within the first opening such that the point is viewable through the first opening from either of the opposing side surfaces; and
- a level vial supported by the level body within the second opening such that the level vial is viewable through the second opening from either of the opposing side surfaces; and
- an end window that partially surrounds the angle indicator and extends from the base surface to the upper surface.

19. The leveling tool of claim 18, further comprising:
- a first pair of side windows supported within the first opening, each side window of the first pair of side windows is located adjacent to and substantially parallel to one of the opposing side surfaces of the level body; and
- a second pair of side windows supported within the second opening, each side window of the second pair of side windows is located adjacent to and substantially parallel to one of the opposing side surfaces of the level body.

20. The leveling tool of claim 18, wherein the angle indicator comprises:
- an axle mounting aperture;
- an expanded base extending in a first direction away from the axle mounting aperture, wherein a width of expanded base increases as the distance from the axle mounting aperture increases; and
- a needle arm extending away from the axle mounting aperture in a second direction opposite the first direction, wherein the needle arm tapers to the point as the distance from the axle mounting aperture increases.

21. The leveling tool of claim 20, wherein the level vial is aligned with a first axis, and further comprising:
- a second level vial aligned with a second axis;
- a third level vial aligned with a third axis, wherein the first axis is perpendicular to second axis and the third axis and the second axis is perpendicular to the third axis; and
- an attachment device supported by the level body and configured to engage a workpiece to support the leveling tool in a fixed relation to the workpiece, wherein the attachment device is located at an end of the level body opposite from the angle indicator.

* * * * *